T. Mussey,
Street Sweeper.
Nº 3,298.                    Patented Oct. 12, 1843.
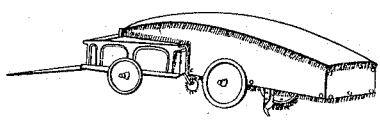
No. 1.
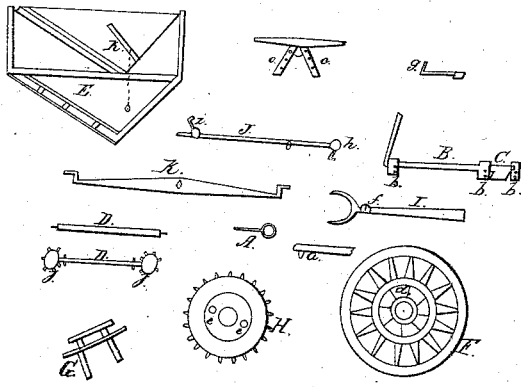
No. 4.
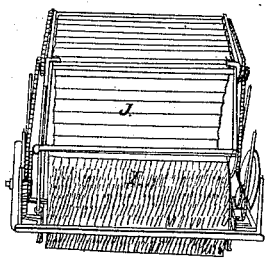
No. 2.
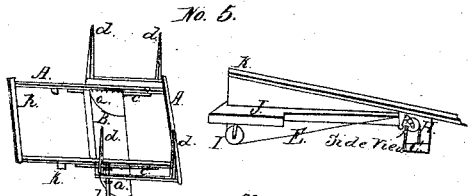
No. 5.
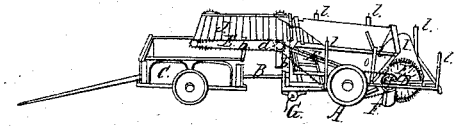
No. 3.
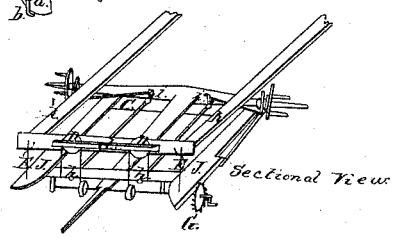
Sectional View

UNITED STATES PATENT OFFICE.

THOMAS MUSSEY, OF NEW LONDON, CONNECTICUT.

IMPROVEMENT IN MACHINES FOR SWEEPING STREETS, &c.

Specification forming part of Letters Patent No. 3,298, dated October 12, 1843.

*To all whom it may concern:*

Be it known that I, THOMAS MUSSEY, of New London, in the county of New London and State of Connecticut, have invented a new and useful Machine for Sweeping Streets and Conveying the Dirt or Sweepings into a Cart or Tender Properly Adapted to the Machine; and I do hereby declare that the following is a full, clear, and exact description of the construction and operation of the same, reference being had to the annexed drawings, making a part of this specification, in which—

Figure 1 is a perspective view; Fig. 2, a transverse elevation; Fig. 3, a longitudinal elevation, &c.

This machine is necessarily connected with a cart or tender properly adapted to it, as mentioned above, for the purpose of drawing it along, putting its machinery in proper motion, receiving the dirt, &c. To effect this the two are connected together in the following manner, viz: A strong eyebolt, No. 4, letter A, the eye one and a quarter inch in diameter, is inserted in the center of the hinder part of the axle of the cart and made to receive a stout iron hook, No. 4, a, attached to the forward end of the neap or tongue, No. 3, B, of the machine, so that when united they move with all the freedom of a wagon. To secure it in its place a rod, which I call the "securing-rod," No. 4, B, passes under the body of the cart directly behind the axle and parallel with it, and secured to the under side of the cart-body by boxes or clamps, No. 4, b b b, near the ends of the rod, so that the key or loop end, No. 4, C, of the rod may hang directly over the eye of the bolt. By this means the hook on the neap is secured in the eye. Now to detach the cart from the machine turn the handle or end of the rod on the side of the cart from the right hand to the left or from a horizontal to a perpendicular position, which brings the key or loop at the other end into a horizontal position and permits the hook on the end of the neap of the machine to be raised from the eyebolt and the cart to be detached from the machine.

To the under side of the cart which I have lately made are two pieces of wood, No. 4, c c, each about three feet long, three inches wide, and two inches thick, secured firmly to the flooring of the cart-body, and made to range diagonally from the eyebolt back to where their after ends diverge to a distance of about three feet apart. They are faced with iron on the sides next to each other to resist the wear of the ends of the neap and are termed "directors," because they direct the neap to the eyebolt. Their use is this: When the neap of the machine is raised up to the under side of the cart-body anywhere within eighteen inches of the middle, and the cart backed toward the machine, the neap will be forced to the eyebolt, when the hook may be dropped into the eyebolt and secured to the cart.

The machine is composed of two principal parts: first, the carriage-wheels, No. 3, A, on which it rests and which are about four feet in diameter, an iron axle (adapted to the width of the machine) and neap, No. 3, B, the forward frame-work attached, No. 3, b b, a part of which overhangs the cart-body, No. 3, C, to convey the dirt into it, and sustains the chain cog-pulleys, No. 3, c d, chains, No. 3, E E, and rollers, No. 4, D D, which give direction and motion to the revolving apron, Nos. 2 and 3, J, that conveys the dirt from the brushes or brooms, Nos. 2 and 3, I, into the cart. The other part is the brush-frame, No. 5, A A, which supports the hinder parts of the dust-case, No. 4, E, and revolving apron with the roller, on which it turns, the cylindrical apron, No. 5, B, its end pieces, No. 5, a a, sliding casters, No. 5, b, and adjusting-levers, No. 5, c c, the wheels, No. 5, F, that convey motion to the brushes, and four upright posts, No. 5, d d d d.

Particular description of the manner in which the machine is made and moves, viz: On the inner face of the naves or hubs of the carriage-wheels, No. 4, F, on which the machine rests, and which face is an extension of the boxes of the wheels in the form of a flange and made of strong hard metal, are holes or cavities, No. 4, d, eight or ten in number, of an inch or more deep, sufficiently large to receive the ends of a gearing-fork, No. 4, G, which are an inch or more in diameter. These holes or cavities are arranged in a circle around the axle and about two inches from it. The sides of the holes or cavities opposite the motion of the wheels as they move forward are at right angles to the face of the wheels, so that when the forks are thrust into the holes or cavities they are locked to the hubs, and by the forward motion of the wheels carry the machinery. The opposite sides are inclined planes to the faces. Next to the inner face of the hubs of the carriage-wheels and on the same axle are large chain cog-wheels, No. 4, H, one on each side, with two rows of cogs on each for cog-chains. Through each of these wheels two holes, No. 4, e e, are made to receive the prongs of the gearing-forks and permit them to enter the holes or cavities in the hubs of the main or carriage wheels. Next to these wheels on the axle are two plates having necks and rims or flanges fitted to the axle with a space on the axle for them to move to and from the wheels an inch or more. Into these plates are secured two steel bolts, each of which passes through the wheels and steps into the holes or cavities above described. These plates and their bolts are called "gearing-forks," No. 4, G, for when they are thrust home and the carriage-wheels move along they carry round the cog-wheels and with them all the machinery; but when these are withdrawn so as to be clear from the carriage-wheels the machinery will cease to operate, although the machine may be moved in any direction. When the machine retrogrades, the forks are thrust out of the holes or cavities by the inclined planes and are pushed into the next by the springs, and so continually while moving backward; also, when one wheel moves faster than the other by moving on the outer side of a circle it carries all the machinery, and by the inclined planes of the holes or cavities in the opposite wheel permits the fork to go forward with the other machinery, which gives to the machine a self-adjusting power. I have also contemplated another mode of effecting the same thing—viz., by fixing face-ratchets between the hubs of the wheels and the large chain cog-wheels, No. 4, H. A face-ratchet has its teeth resembling saw-teeth, but very broad on the face side of the wheel instead of the rim. They interlock each other, so that when the main or carriage wheels advance forward they put the machine in proper motion, but when they move backward the ratchets slide by each other. The contrivance is not, in my opinion, good; but I mention it to meet those who invent by making trifling alterations.

The machine is kept in gear or working order by two springs, No. 4, I, screwed to the main frame forward of the wheels, and made to press on the plates or gearing-forks, which keep their ends in the holes or cavities in the naves of the wheels. Into these springs are inserted eyebolts, No. 4, f, near the gearing-forks, which receive hooks, No. 4, g, the opposite ends of which are attached to upright arms of two round bars of iron termed "ungearing-rollers," No. 4, J, situated toward the middle and running parallel with the machine. These ungearing-rollers are operated on by a windlass having a ratchet-wheel and pawl, Nos. 3 and 5, G, and where power is required a cog-wheel and pinion are added and are turned with a crank. These rollers are connected to it by two ropes or chains, one end of which is made fast to the horizontal arms, Nos. 4 and 5, h, and passing over pulleys, No. 5, D D, comes down on the front side of the windlass, so that by turning the windlass round it operates to bring down the forward end of the brush-frame, and at the same time raises the horizontal arms of the ungearing-rollers and draws the upright arms, Nos. 4 and 5, i i, in a direction from the wheels, and by means of the hooks, which connect them with the springs, draws the gearing-forks out of the holes or cavities, so that the carriage-wheels can be moved in any way without operating on the machinery. The same operation raises the brush and its appendages about eight inches from the ground, allowing the cart and machine to be moved about like a wagon. The pulleys, No. 5, D D, play in a piece of wood secured to the forward end of the brush-frame by a strong iron bolt, No. 5, d, in its center, so that the pulleys may adjust themselves to any inequality in the length of the ropes, and thereby insure the ungearing of both sides of the machine at the same time. The forward frame-work, No. 3, b b, which is permanently attached to the axle, extends forward of it about four feet. It then rises perpendicularly about four feet, and then extends forward horizontally about five, corresponding to the length of the neap. This projecting part of the frame sustains the forward cog chain-pulleys, No. 3, c d, and the cog-rollers, No. 4, D, which carry the revolving apron, Nos. 2 and 3, j. In the outside of the upright portion of the frame, and near the top on each side, are double cog chain-pulleys, No. 3, d, to accelerate the motion of the revolving apron. The other part I call the "brush-frame," because it sustains the brushes and gives them freedom of motion, whether it be an up-and-down or rocking motion, for when the street has ridges extending directly across it the motion of the brush-frame is up and down; but when one wheel of the machine rises while the other is depressed the brush-frame, with its iron plates, No. 5, k k, by resting on the balance-rocker, keeps parallel with the street.

The brush-frame is oblong, being about five feet wide and ten feet long. The sides where they rest on the rocker are about seven inches deep by two inches thick. This frame has a box across the fore end, into which weights may be put to help to equalize the weight of the brushes and other parts connected with them, which rest on the hinder part of the frame. The balance-rocker, No. 4, K, is made of iron, about one inch by four in the middle, and tapering toward the ends. Its length corresponds with the width of the brush-frame. It hangs upon a strong iron bolt projecting about three inches from the hind part of the axle at its center. This gives freedom to the brushes, as above described. To furnish the principal balance for the brushes, and at the same time to lighten the forward part of the frame-work which hangs over the cart, and prevent it from bearing too heavily on the neap, a heavy weight No. 5, C C, is hung by two strong ropes or chains secured to its ends. These ropes or chains, No. 5, E, pass over two pulleys, No. 5, H, (which pulleys are sustained by strong iron supports, No. 5, j, made fast to the under side of the axle two or three inches from its shoulders and near the wheels) and pass forward to two pulleys, No. 5, I, situated directly under the forward end of the brush-frame, then passing under the pulleys and through the lower frame-work, No. 5, J, of the machine up to the forward end of the brush-frame No. 5, K, where they are made fast. These weights are of iron or lead; but lead would be preferable, as it occupies less space and is always worth about what it costs. The effect of this combination is twofold: While it serves to balance the after part of the brush-frame, the brushes, and other machinery resting upon it, it at the same time balances the forward framework so nearly that the neap may be raised by one hand. This weight was not put onto the model because it was so light that it worked better without it, but in a large machine it is almost indispensable.

The brushes, Nos. 2 and 3, I, are sufficiently long to sweep a strip about five feet wide, being from fourteen to twenty in number and arranged circularly around an arbor and secured at each end by screw-bolts passing through sheet-iron end pieces, No. 3, H, resembling drum-heads. These end pieces are pierced in the centers by the arbor on which they and the brushes revolve. They are about forty-inches in diameter. In these end pieces are slots cut about eight inches long and half an inch wide, ranging from the center to the periphery and corresponding with the number of brushes. Through these slots screws pass into the ends of the brushes and fasten them any distance from the center which the slots will allow. The use of these slots is to permit the brushes to be slid out as the ends wear off, thereby saving the expense of renewing them until they are worn out.

The brushes are made of straight-fibered wood of the hardest and toughest kind (or any other suitable material) sawed or slitted into slips of about sixteen inches long, of two to three inches wide, and from one to three sixteenths of an inch thick. These again are sawed or slitted into slips of about a foot long and an eighth of an inch wide, four inches at one end being left whole the better to secure them to the pieces by which they are supported in the brush-frame or between the sheet-iron end pieces. To these also may be added unrotted flax, broom-corn, or any soft material to add compactness and pliability to the sawed or slitted portions of wood. On each end of the brush-arbor is a spur cog-wheel, No. 3, D, which is moved by similar wheels, Nos. 3 and 5, F, lying between these and the main or carriage wheels, No. 3, A, of the machine, and are attached to chain cog-wheels, which are moved by the large chain cog-wheels, No. 4, H, on the axle described in the first part of this specification, and they derive their motion from the main or carriage wheels of the machine as therein described. The largest chain cog-wheels, No. 4, H, of the machine having two rows of cogs on each carry by their chains the brush in the rear and the revolving apron in the front. Partly under the brushes, but principally forward of them, is a cylindrical apron, No. 5, B, made of iron and attached to the brush-frame, No. 5, A A, by two end pieces of wood, No. 5, a a, nearly a quarter of a circle each. To these are also attached on the outside of the pieces sliding casters, No. 5, b, of the hardest metal and made to slide easily over the ground or pavement, and by levers and adjusting-screws, No. 5, c c, made to depress or elevate the brush-frame and give the brushes more or less power in their work. The cylindrical apron is about one-sixth of the circle made by the brushes in revolving on their arbor. It serves to hold the dirt to the brushes until it is raised and thrown on the revolving apron. The revolving apron, Nos. 2 and 3, I, which of course is endless and is made of duck or any other pliable and durable material, revolves on rollers, one of which is placed under the ltp of the cylindrical apron to support the revolving apron while it receives the dirt thrown on it by the brushes. The next two rollers are placed at the angle where the apron passes from an elevating to a horizontal motion. The fourth roller, No. 4, D, is placed at the extreme forward end of the apron and gives motion to it. This is effected by two or more cogs, No. 4, j j, at each end of the roller, which lock into cross-pieces, which extend across the apron and project over over it on each side about an inch. The ends of these pieces are iron and rest upon supports at the sides attached to the dust-case to prevent the apron from sagging. These cross-pieces are about nine inches or less apart, or nearly equal to half or quarter the circumference of the rollers, so that each pair of cogs take hold of a cross-piece, carry it half round, when the next pair take the next, and so keeping the apron in motion while the machinery moves. On each side of the apron are sewed strong cords about three-fourths of an inch in diameter. These serve to keep the dirt on the apron, to which they give firmness, the iron ends of the cross-pieces being secured firmly to them. I have also contemplated using cog-chains secured to the sides of the apron to carry it forward, which will answer the same and perhaps better purpose as the cogs on the ends of the roller.

Two other modes can be adopted to carry forward the apron besides those mentioned—viz., by wheels only or by pieces secured to and ranging across the inner side of the apron and made to match and lock with similar pieces ranging longitudinally on the moving roller. Directly over the apron is a dust-case, No. 4, E, tight at top and sides, and so fitted to the apron as to prevent the dust from escaping while the machine is in motion. On the lower and inside of the dust-case, directly over the sides of the apron, are fringes of Manila hemp, under which the cross-pieces pass freely while the dust and gravel are kept from the machinery and from annoying people in the streets. On the inside of the dust-case and about a foot from its lower part is a rod, No. 4, $k$, ranging parallel with the brushes and placed so near them that they strike the rod as they revolve, which jars off the dirt that adheres to them and prevents its being carried back on the brushes.

The whole machine, the cart excepted, is covered in the manner of a close carriage, the covering being supported by a light frame resting on the upright posts, No. 3, $e\ e\ e\ e\ e\ e$, and extending to the ground.

What I claim as my invention, and wish to secure by Letters Patent, is—

1. The securing-rod and the directors, in combination with the cart, the eyebolt in the axle of the cart, and the hook on the neap of the machine to unite and separate the machine and cart with the least possible delay, and to secure them fast together when they are united, as described, the cart giving motion to the machine and receiving the dirt as fast as the machine collects it.

2. In combination, the peculiar manner of constructing the brushes, (as set forth in the specification,) with the sheet-iron end pieces, slots, and screw-bolts attached, by which combination the brushes are easily extended until they are worn out.

3. The combination of the cylindrical apron, the end pieces of wood attached with the sliding casters, the adjusting levers and screws, the brush-frame with its iron plates resting on the balance-rocker, also the balance-rocker itself, which combination has the effect of sustaining the brushes, holding the dirt to them, and adjusting them to the inequalities of the ground.

4. The ungearing-rollers, in combination with the springs, clutch-boxes on the hubs, the windlass, and the ropes or chains connecting the ungearing-rollers with the forward end of the brush-frame, by which combination the machine is put out of gear and the brush raised, and in this manner rendered capable of being moved about like a wagon.

T. MUSSEY.

Witnesses:
  N. FOSDICK,
  A. E. BROWN.